UNITED STATES PATENT OFFICE.

SHERMAN CLARK, OF GOLD HILL, OREGON.

EXPLOSIVE COMPOUND.

SPECIFICATION forming part of Letters Patent No. 649,913, dated May 22, 1900.

Application filed January 26, 1900. Serial No. 2,825. (No specimens.)

*To all whom it may concern:*

Be it known that I, SHERMAN CLARK, a citizen of the United States, and a resident of Gold Hill, in the county of Jackson and State of Oregon, have invented certain new and useful Improvements in Explosive Compounds, of which the following is a specification.

My invention, while relating to explosive compounds generally, has reference more particularly to that class thereof which are made use of in projectiles, torpedoes, submarine mines, and the like, as well as for blasting and other similar purposes, its object being to provide an explosive compound of this class which in addition to being cheap of manufacture, powerful in operation, and safe in production and handling shall at the same time emit the least amount of fumes when exploded, and these be of a character that will quickly pass away, shall be unaffected in its strength either by heat or cold or by dampness, and shall be capable of manufacture in stick or other form.

To these ends the invention consists in a peculiar composition of matter having the characteristics mentioned, all as will hereinafter more fully appear.

In the production of my improved compound I make use of the following ingredients, viz: crude nitrate of soda, commercial sulphur, metallic antimony, charcoal or coke, picric-acid crystals, nitric acid, rosin or flour, and water. These after having been properly prepared may be combined in various proportions. The preparation and proportions which I have found to give the best results in practice, however, are substantially the following, the proportions being taken by weight: I first dry and take nineteen (19) parts of the nitrate of soda, two and one-half ($2\frac{1}{2}$) parts of the metallic antimony, three (3) parts of the sulphur, three and one-half ($3\frac{1}{2}$) parts of the charcoal or coke, one-third ($\frac{1}{3}$) part of the picric-acid crystals, and one-half ($\frac{1}{2}$) part of the rosin or flour and crush or pulverize each separately until they severally reach such a degree of subdivision that the nitrate of soda, the sulphur, the charcoal or coke, and the rosin or other equivalent will each pass through a sixty (60) mesh screen, the antimony through an eighty (80) mesh screen, and the picric-acid cyrstals are reduced to a powder. I next take one-third ($\frac{1}{3}$) part of the nitric acid and approximately four (4) parts of the warm water, which after having been thoroughly commingled are added to the nitrate of soda and mixed and agitated therewith until the last-mentioned ingredient is nearly dissolved. I next take the charcoal or coke and sulphur and after having thoroughly intermixed them add them, with the metallic antimony and picric-acid crystals, to the solution of nitrate of soda, nitric acid, and water and then grind and mix the several ingredients thoroughly together while adding thereto the rosin or its equivalent, which serves as a binder or reducer for the other elements. The several ingredients thus brought together thereupon appear in the form of a soft mushy mass, which if too dry or stiff to permit of their ready incorporation may be softened or tempered by the addition of a further amount of warm water, if so desired. The thorough commingling of the several ingredients having been accomplished, the compound is then dried until it is in condition either for molding or for granulation, as may be required. When it is desired to mold the same, this drying operation will be continued until the compound is sufficiently stiff and hard to retain the particular form that may be imparted to it, when it will be forced into molds of the required shape by appropriate pressure, after which it will be removed therefrom and dried, when it will be in condition ready for use. On the other hand, when it is desired to granulate the same then the drying operation will be continued until the compound is thoroughly dry, after which it will be crushed to the required degree of fineness by any of the means usually employed for such purposes, and the resulting product thereby in like manner made ready for its intended uses.

In some instances it may be found convenient to use the crushed compound in the condition it is left by the crushing devices with the various sizes of granules or kernels intermixed, and in those cases no further treatment of the same will be required prior to its use. I prefer, however, to segregate the different sizes of granules or kernels from one another by appropriate screens after the crushing of the compound has been effected and to employ the different sizes thereof by themselves as the requirements of the particular uses to which the compound may be applied demand.

When desired, the intermixing of the several ingredients may be effected by hand, in which cases only a suitable receptacle for the mass and such stirring implements as, for instance, paddles, shovels, or the like will be required. It is preferred, however, to effect this intermixing by machinery, and especially so when large masses of the compound are to be produced, and in these cases any of the ordinary and well-known mixing apparatus employed in powder-mills and chemical works may be employed; but as these form no part of my present invention a further description of the same herein is not deemed necessary.

As thus described, an explosive compound is produced which is incapable of explosion except when confined, but when in that condition may be readily fired by a fuse or electric spark, is much more powerful in its operation and can be manufactured at a much less cost than the ordinary black powder now in use, is thoroughly safe in manufacture and handling, and is in no way injuriously affected by changes in the atmospheric or hygrometric conditions.

Although in the foregoing I have described the proportions and the particular ingredients which I have found in practice to give the best results I wish it distinctly understood, however, that I do not limit myself strictly thereto, as it is obvious that I may not only modify the proportion, but substitute other ingredients for some of those mentioned—as, for instance, flour and other materials in place of the rosin—without departing from the spirit of my invention.

Again, while I have described the crushing or pulverization of the sulphur and charcoal or coke as effected when such ingredients are separated I may, if I so desire, combine them before that operation and effect it while they are in that condition, reducing the combined mass in that case until it will pass through a sixty (60) mesh screen.

Having now described my invention and specified certain of the ways in which it is or may be carried into effect, I claim and desire to secure by Letters Patent of the United States—

1. The herein-described explosive compound formed by mixing nitrate of soda, sulphur, metallic antimony, carbonaceous matter, picric acid, nitric acid, and a reducer, substantially as described.

2. The herein-described compound, formed by mixing nitrate of soda, sulphur, metallic antimony, carbonaceous matter, picric acid, nitric acid, rosin, and water, in the proportions, substantially as described.

In witness whereof I have hereunto set my hand this 19th day of January, 1900.

SHERMAN CLARK.

Witnesses:
W. A. CARTER,
W. H. RICKEY.